US012697748B2

(12) United States Patent
Risi

(10) Patent No.: US 12,697,748 B2
(45) Date of Patent: Aug. 4, 2026

(54) WOOD TREATMENT COMPOSITIONS HAVING ANTIMICROBIAL PROPERTIES

(71) Applicant: Société en Commandite Prolam, Cap-St-Ignace (CA)

(72) Inventor: Benoît Risi, Cap-St-Ignace (CA)

(73) Assignee: Société en Commandite Prolam

( * ) Notice: Subject to any disclaimer, the term of this patent is extended or adjusted under 35 U.S.C. 154(b) by 276 days.

(21) Appl. No.: 18/361,022

(22) Filed: Jul. 28, 2023

(65) Prior Publication Data

US 2024/0033966 A1 Feb. 1, 2024

Related U.S. Application Data

(60) Provisional application No. 63/393,539, filed on Jul. 29, 2022.

(51) Int. Cl.
*B27K 3/34* (2006.01)
*B27K 3/02* (2006.01)
*B27K 5/00* (2006.01)

(52) U.S. Cl.
CPC ............ *B27K 3/343* (2013.01); *B27K 3/0242* (2013.01); *B27K 5/001* (2013.01)

(58) Field of Classification Search
None
See application file for complete search history.

(56) References Cited

U.S. PATENT DOCUMENTS 4,220,688 A 9/1980 Mitchell et al.
4,732,817 A * 3/1988 Lotz ........................ B27K 3/38 106/18.36
4,988,545 A 1/1991 Laks
5,270,083 A * 12/1993 Lotz ........................ A01N 61/00 427/393
6,045,865 A * 4/2000 Felby ..................... B27K 3/346 427/393

(Continued)

FOREIGN PATENT DOCUMENTS

BR 200601476 B1 5/2006
CN 111251400 A 6/2020
EP 2199046 A1 * 6/2010 ............. C08L 97/02

OTHER PUBLICATIONS

Broda, "Natural Compounds for Wood Protection against Fungi—A Review", Molecules, 2020, vol. 25, 3538, pp. 1-24.

(Continued)

*Primary Examiner* — Chinessa T. Golden
(74) *Attorney, Agent, or Firm* — Wood, Phillips, Katz Clark & Mortimer

(57) ABSTRACT

The present application relates to wood treatment. More specifically, the present application relates to wood treatment compositions having antimicrobial properties, methods using the same and wood products treated therewith. The present application includes a wood treatment composition comprising: an antimicrobial additive comprising at least one tannin; and a water-based solvent. The present application also includes a method for treating a wood product to stop or prevent microbial growth applying a wood treatment composition on the wood product, and optionally applying a wax; wherein applying the wood treatment composition comprises heating at least one surface of the wood product and impregnating the composition.

14 Claims, 9 Drawing Sheets

(56) References Cited

U.S. PATENT DOCUMENTS

| | | | |
|---|---|---|---|
| 6,955,826 | B2 | 10/2005 | Lamb et al. |
| 2004/0258838 | A1 | 12/2004 | Richardson et al. |
| 2007/0227399 | A1 | 10/2007 | Abou-Nemeh |
| 2021/0276219 | A1 | 9/2021 | Thibault et al. |

OTHER PUBLICATIONS

Scalbert, "Antimicrobial Properties of Tannins", Phytochemistry, 1991, vol. 30, No. 12, pp. 3875-3883.

Tondi et al., "Impregnation of Scots Pine and Beech with Tannin Solutions: Effect of Viscosity and Wood Anatomy in Wood Infiltration", Wood Sci Technol, 2013, vol. 47, pp. 615-626.

* cited by examiner

Control (-) 25% 4% 2% 1% 0,5% 0,25% 0,125%

Control (-) 25% 4% 2% 1% 0,5% 0,25% 0,125%

Control (-) 25% 4% 2% 1% 0,5% 0,25% 0,125%

Negatif control

Positive control

Without treatment

Wood + tannin (~17%) + paraffin

Wood + tannin (~17%)

WOOD TREATMENT COMPOSITIONS HAVING ANTIMICROBIAL PROPERTIES

CROSS-REFERENCE TO RELATED APPLICATIONS

The present application claims the benefit of priority of U.S. Provisional Patent Application No. 63/393,539, which was filed Jul. 29, 2022, the contents of which are incorporated herein by reference in their entirety.

FIELD

The present application is in the field of wood treatment. More specifically, the present application relates to wood treatment compositions having antimicrobial properties, methods using the same and wood products treated therewith.

BACKGROUND

Tannins are a class of biomolecules naturally present in plants, mainly polyphenolic compounds, and are known for their astringent properties through their ability to bind to proteins, amino acids, alkaloids and precipitate them. Tannins and related compounds are widely distributed in many plant species, where they protect plants from predation, function as pesticides and aid in plant growth regulation. Tannins may be found for example in leaf, bud, seed, root, and stem tissues. These compounds have been traditionally used in tanning processes for hundreds of years.

There are various reasons for wood treatment, such as preservation to increase durability and resistance, improving resistance to specific substances like water-resistance or the like, providing resistance to fire or high temperatures, providing resistance to organisms such as fungi, insects, microbes, etc. In some applications, it may be desirable for the wood treatment to be safe and non-toxic for human handling, for example for surfaces that may be in contact with food or surfaces for which extensive exposition to humans may be present. Notably, wood has been safely used for centuries in contact with food but is usually questioned because of its microbiological behavior compared with smooth surfaces.

As such, there is need to provide improved compositions for wood treatment which demonstrate antimicrobial properties, that are cheap and easy to manufacture, making the treated wood products less harmful and suitable for various uses such as use with food.

SUMMARY

It has been surprisingly shown herein that compositions of the present application provide for wood treatment compositions with antimicrobial properties that are both safe and easy to manufacture. The compositions of the present application further provide for methods to treat wood and wood products treated therewith. Comparable compositions did not display the same properties, highlighting the surprising results obtained with the compositions of the application.

Accordingly, the present application includes a wood treatment composition comprising: an antimicrobial additive comprising at least one tannin; and a water-based solvent.

The present application also includes a wood treatment composition comprising: an antimicrobial additive comprising at least one tannin selected from the group consisting of *Limonium delicatulum* extract, *Pinus radiata* extract, *Acacia mollissima* extract, *Coriaria nepalensis* extract, *Picea abies* extract, *Myrciaria jaboticaba* extract, *Anadenanthera macrocarpa* extract, *Spondias tuberosa* extract, *Mimosa tenuiflora* extract, *Acacia mearnsii* extract and combinations thereof; and water; wherein the antimicrobial additive is in an amount of from about 2% to about 15%, by weight of the composition; and wherein the composition provides at least about 95% reduction in growth of microbes.

Also provided is a method for treating a wood product to stop or prevent microbial growth, the method comprising: applying a wood treatment composition on the wood product, the composition comprising:

an antimicrobial additive comprising at least one tannin; and a water-based solvent.

optionally applying a wax;

wherein applying the wood treatment composition comprises heating at least one surface of the wood product and impregnating the composition.

Also included is use of the wood treatment composition of the present application, and wood product treated therewith.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF DRAWINGS

The embodiments of the application will now be described in greater detail with reference to the attached drawings in which:

FIG. 2A: *E. coli*; FIG. 2B: *S. aureus*; FIG. 2C: *Salmonella enterica*.

FIG. 10A shows the inhibition zone for Sample X humidified and FIG. 10B at 4-10× magnification; and FIG. 10C shows the inhibition zone for a filter impregnated, according to Example 6.

FIG. 12A after being contacted with paraffin treated wood; FIG. 12B after being contacted with tannin treated wood.

FIG. 13A shows MCT growth media; FIG. 13B shows MacConkey growth media; and FIG. 13C shows DE Neutralizing growth media.

FIG. 14A shows MCT growth media; FIG. 14B shows MacConkey growth media; and FIG. 14C shows DE Neutralizing growth media.

DETAILED DESCRIPTION

I. Definitions

Figure 1:
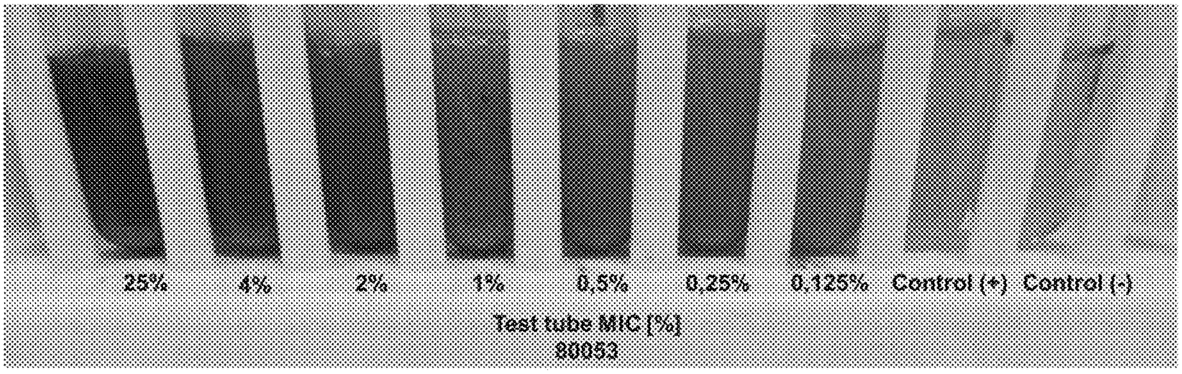
FIG. 1 shows solutions comprising different concentrations of the composition according to exemplary embodiments of the present application, after inoculation and incubation at 36° C. for 24 h.

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

As used in the present application, the singular forms "a", "an" and "the" include plural references unless the content clearly dictates otherwise. For example, an embodiment including "a compound" should be understood to present certain aspects with one compound, or two or more additional compounds.

In embodiments comprising an "additional" or "second" component, such as an additional or second compound, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "composition of the application" or "composition of the present application" and the like as used herein refers to a composition comprising one or more compounds of the application.

The term "suitable" as used herein means that the selection of the particular composition or conditions would depend on the specific steps to be performed, the identity of the components to be transformed and/or the specific use for the compositions, but the selection would be well within the skill of a person trained in the art.

The present description refers to a number of chemical terms and abbreviations used by those skilled in the art. Nevertheless, definitions of selected terms are provided for clarity and consistency.

The term "aq." as used herein refers to aqueous.

The term "tannin" as used herein refers to a class of biomolecules naturally present in plants, mainly polyphenolic compounds, and are known for their astringent properties through their ability to bind to proteins, amino acids, alkaloids and precipitate them.

The term "antimicrobial" as used herein refers to an agent that kills, stop or prevent the growth of microorganisms such as bacteria, fungi, parasites, etc. Antimicrobial may be classified according to their function (antibacterial, antifungal, etc.) and further subdivided. For example, antibacterial agents can be further subdivided into bactericidal agents, which kill bacteria, and bacteriostatic agents, which slow down or stall bacterial growth.

II. Compounds and Compositions of the Application

It has been surprisingly shown herein that compositions of the present application provide for wood treatment compositions with antimicrobial properties that are both safe and easy to manufacture. The compositions of the present application further provide for methods to treat wood and wood products treated therewith. Comparable compositions did not display the same properties, highlighting the surprising results obtained with the compositions of the application.

Accordingly, the present application includes a wood treatment composition comprising: an antimicrobial additive comprising at least one tannin; and a water-based solvent.

In some embodiments, the at least one tannin is selected from the group consisting of *Limonium delicatulum* extract, *Pinus radiata* extract, *Acacia mollissima* extract, *Coriaria nepalensis* extract, *Picea abies* extract, *Myrciaria jaboticaba* extract, *Anadenanthera macrocarpa* extract, *Spondias tuberosa* extract, *Mimosa tenuiflora* extract, *Acacia mearnsii* extract and combinations thereof. In some embodiments, the at least one tannin is a mimosa tree extract. In some embodiments, the at least one tannin is an acacia tree extract. In some embodiments, the at least one tannin is a hydrolysable tannin or a condensed tannin. In some embodiments, the at least one tannin comprises at least one polyphenolic compound comprising a plurality of base units (monomers) selected from a carbohydrate, gallic acid, phloroglucinol, flavan-3-ol, and combination thereof:

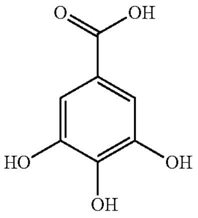

Gallic acid

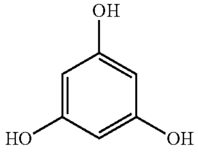

Phloroglucinol

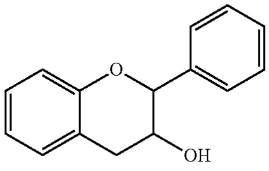

Flavan-3-ol

In some embodiments, the polyphenolic compound comprises from 2 to 50 monomers. In some embodiments, the polyphenolic compound has a molecular from 500 to 20,000 Daltons. In some embodiments, the polyphenolic compound has a molecular from 500 to 3,000 Daltons. A skilled person in the art would fully appreciate that the tannins present in a tree extract will depend on the species, the method of extraction, or other known factors and an important number of tannins will be present in combination.

In some embodiments, the at least one tannin is an *Acacia mearnsii* tree extract, such as Weibull™ AQ available from TANAC S.A. or Bondtite™ 945, available from Bondtite Pty Ltd.

In some embodiments, the water-based solvent comprises water and a water-miscible solvent selected form ethylene glycol, ethanol, methanol, and mixtures thereof. For example, the water-miscible solvent is present in an amount of about 0.5%, or about 1%, or about 2% or about 5%. In some embodiments, the water-based solvent is water.

In some embodiments, the composition is saturated with the antimicrobial additive. In some embodiments, the antimicrobial additive is in an amount of from about 2% to about 15%, by weight of the composition, or in an amount of about 4% to about 15%, or about 12% to about 15%. In some embodiments, the composition is saturated with the antimicrobial additive in an amount of about 14.5% by weight of the composition.

In some embodiments, the composition provides a reduction in growth of microbes of at least about 95%, or at least about 98%, or at least about 99%. In some embodiments, the composition provides a reduction in growth of microbes of about 99%.

In some embodiments, the antimicrobial additive is a broad-spectrum antimicrobial. In some embodiments, the reduction on growth of microbes is on gram-positive and gram-negative microbes. In some embodiments, the microbes are selected from the group consisting of *Escherichia coli, Staphylococcus aureus, Salmonella enterica* subsp. *enterica* serovar *typhimurium Enterobacter aerogenes, Salmonella enterica, K. pneumoniae, Pseudomonas aeruginosa*, and combinations thereof. A skilled person in the art will appreciate that growth of other gram-positive and gram-negative microbes may be inhibited, prevented or reduced.

The present application also includes a wood treatment composition comprising: an antimicrobial additive comprising at least one tannin selected from the group consisting of *Limonium delicatulum* extract, *Pinus radiata* extract, *Acacia mollissima* extract, *Coriaria nepalensis* extract, *Picea abies* extract, *Myrciaria jaboticaba* extract, *Anadenanthera macrocarpa* extract, *Spondias tuberosa* extract, *Mimosa tenuiflora* extract, *Acacia mearnsii* extract, and combinations thereof; and a water-based solvent; wherein the antimicrobial additive is in an amount of from about 2% to about 15%, by weight of the composition; and wherein the composition provides at least about 95% reduction in growth of microbes.

III. Methods and Uses of the Application

The compositions of the application have been shown to stop or prevent microbial growth.

Accordingly, provided is a use of a wood treatment composition of the present application for treating a wood product to stop or prevent microbial growth.

Also provided is a wood product treated with the composition of the present application.

In some embodiments, the wood product has at least one surface treated with the composition. In some embodiments, the wood product is a food-contacting wood surface. For example, the wood product is a floor, a pallet, a cutting board, a wooden container, or the like.

The present application also includes a method for treating a wood product to stop or prevent microbial growth comprising applying a wood treatment composition of the present application on the wood product, and optionally applying a wax, wherein applying the wood treatment composition comprises heating at least one surface of the wood product and impregnating the composition.

In some embodiments, the at least one surface is heated at a temperature of about 100 to about 120° C. In some embodiments, the at least one surface is heated for less than one minute. In some embodiments, the at least one surface is heated for about 30 seconds to about one minute. In some embodiments, the at least one surface is heated for about 45 seconds.

In some embodiments, impregnating the composition comprises dipping the at least one surface in the composition. For example, the at least one heated surface may be dipped in the composition for less than 30 seconds. In some embodiments, the at least one heated surface is dipped in the composition for about 20 seconds to about 30 seconds. In some embodiments, the at least one heated surface is dipped in the composition for about 25 seconds.

In some embodiments, optionally applying a wax comprises heating the at least one surface of the wood product and impregnating in heated wax. In some embodiments, the heating and impregnating is carried out as for the wood treatment composition, at similar temperature and time. In some embodiments, the wax is paraffin. Without being bound to theory, the wax is used to create a protection against water on the wood product. In some embodiments, the wax is pre-heated at a temperature of about 50 to about 70° C. In some embodiments, the wax is pre-heated at a temperature of about 55 to about 65° C. In some embodiments, the wax is pre-heated at a temperature at about 65° C.

In some embodiments, stopping or preventing microbial growth will impart good resistance and durability to the treated wood, preventing rotting, decomposition, contamination and the like.

Also provided is use of a wood treatment composition of the present application as an anti-rotting wood treatment.

IV. Methods of Preparing the Compositions of the Application

The present application further provides methods for preparing the compositions of the application.

In some embodiments, the tannin is extracted according to known methods in the art. For example, the extraction process consists of aqueous lixiviation of black wattle bark (*Acacia mearnsii*). In some embodiments, the extract is obtained as taught in U.S. Pat. No. 6,955,826.

In some embodiments, the tannin is diluted in the water-based solvent at about 2% to about 15%.

EXAMPLES

The following non-limiting examples are illustrative of the present application.

Determination of Antibacterial Potential

General Methods

The method was based on the identification of the minimum inhibitory concentration for each of the following test samples:

- Bondtite™ 945—South African mimosa extract (ref. number 80053)
- Tanac Weibull™—Brazilian mimosa extract (ref. number 80053)

Solutions of each tannin extract were first prepared in a non-selective culture medium (nutrient broth) at double the target concentration in a sterile tube. Three sets of tubes were thus prepared for each sample so as to use one for each strain of bacteria to be tested. Cultures of each of the following bacteria were prepared by inoculating nutrient broth and incubating these media for 24 h at 36° C.:

- *Escherichia coli* ATCC 11229;
- *Staphylococcus aureus* ATCC 6538; and
- *Salmonella enterica* subsp. *enterica* serovar *typhimurium* ATCC 14028.

After the incubation period, each culture was diluted at a ratio of one culture volume per 200 volumes of nutrient broth. Finally, the tannin extract solutions were inoculated with an equal volume of diluted suspension of each of the microorganisms, then incubated at 36° C. for 24 h.

After each assay, the tubes were inspected to identify any microbial growth (FIG. 1). For the tubes suspected of not having supported the growth, an aliquot was taken and spread on a nutrient gel and then incubated. The bacterial potential was determined as follows:

- A visible growth in the tube reveals that the tannin concentration is neither bactericidal nor bacteriostatic towards the microorganism tested;
- An absence of visible growth in the tube, but growth on nutrient gel after subculturing reveals that the tannin concentration is bacteriostatic towards the microorganism tested;
- An absence of visible growth in the tube and an absence of growth on nutrient gel after subculturing reveals that the tannin concentration is bactericidal.

Example 1—*E. coli*

Figure 2A:
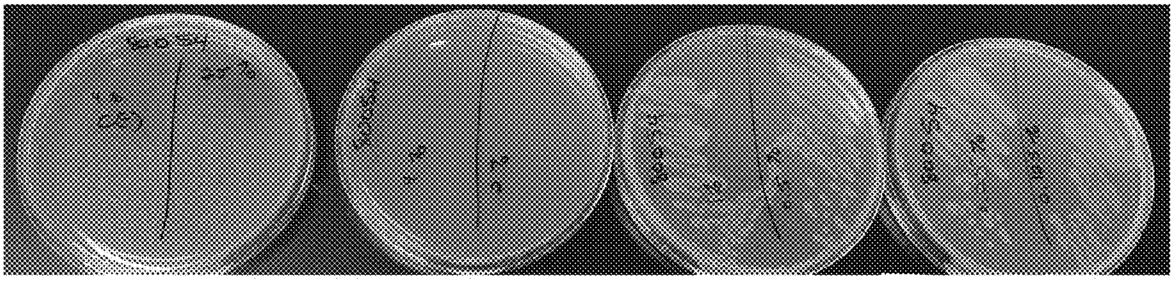
FIGS. 2A-2C show growth of different bacteria on test culture for different concentrations of the composition according to exemplary embodiments of the present application.

Results for *E. coli* are presented in Table 1, and the nutrient gel assay is shown in FIG. 2A.

TABLE 1

Minimum inhibitory concentration for *E. coli*

| Ref. No | IDENTIFICATION | Growth observation environment | CONCENTRATION (%) 25 | 4 | 2 | 1 | 0.5 | 0.25 | 0.125 | 0 |
|---|---|---|---|---|---|---|---|---|---|---|
| 80053 | Bondtite 945 Tanin | Test Tube | – | – | ± | ± | ± | ± | ± | + |
| | extract (Mimosa) | Agar | – | – | – | + | + | + | + | |
| 80054 | Tanac Tanin | Test Tube | – | – | – | ± | ± | ± | ± | |
| | Extract (Mimosa) | Agar | – | – | – | + | + | + | + | |

Example 2—*S. aureus*

Figure 2B:
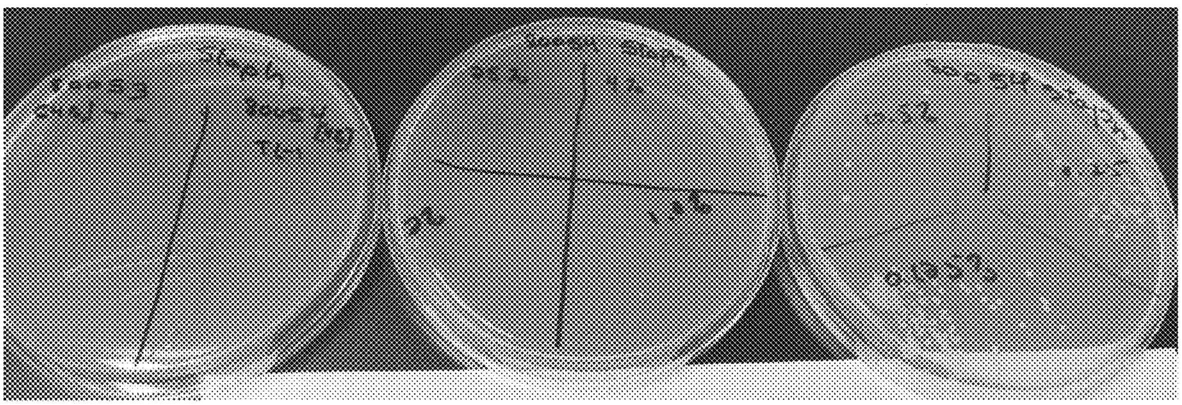

Results for *S. aureus* are presented in Table 2, and the nutrient gel assay is shown in FIG. 2B.

TABLE 2

Minimum inhibitory concentration for *S. aureus*

| Ref. No | IDENTIFICATION | Growth observation environment | CONCENTRATION (%) 25 | 4 | 2 | 1 | 0.5 | 0.25 | 0.125 | 0 |
|---|---|---|---|---|---|---|---|---|---|---|
| 80053 | Bondtite 945 Tanin | Test Tube | – | – | – | ± | ± | ± | ± | + |
| | extract (Mimosa) | Agar | – | – | – | – | ± | + | + | |
| 80054 | Tanac Tanin | Test Tube | – | – | – | – | ± | ± | ± | |
| | Extract (Mimosa) | Agar | – | – | – | ± | ± | + | + | |

Example 3—*S. enterica*

Figure 2C:
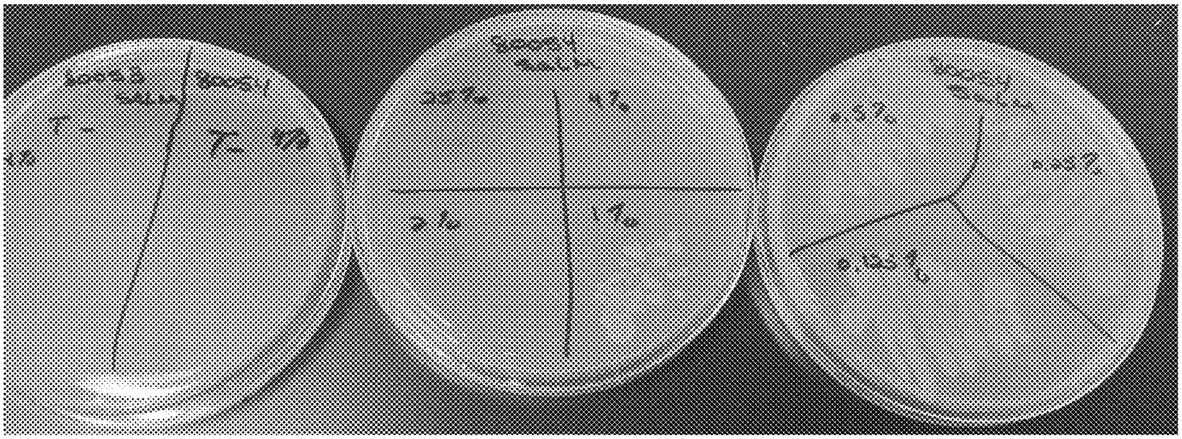

Results for *S. enterica* are presented in Table 3, and the nutrient gel assay is shown in FIG. 2C.

TABLE 3

Minimum inhibitory concentration for *S. enterica*

| Ref. No | IDENTIFICATION | Growth observation environment | CONCENTRATION (%) 25 | 4 | 2 | 1 | 0.5 | 0.25 | 0.125 | 0 |
|---|---|---|---|---|---|---|---|---|---|---|
| 80053 | Bondtite 945 Tanin | Test Tube | − | − | − | ± | ± | + | + | + |
| | extract (Mimosa) | Agar | − | − | − | + | + | + | + | |
| 80054 | Tanac Tanin | Test Tube | − | − | − | ± | ± | + | + | |
| | Extract (Mimosa) | Agar | − | − | − | ± | ± | + | + | |

Results

The Bondtite™ 945 tannin extract exhibited a bactericidal potential towards *Escherichia coli* ATCC 11229 and *Salmonella enterica* subsp. *enterica* serovar *typhimurium* ATCC 14028 at a concentration equal or above 2% and towards *Staphylococcus aureus* ATCC 6538 at a concentration equal or above 1%.

The Tanac Weibull™ tannin extract exhibited a bactericidal potential towards *Escherichia coli* ATCC 11229, *Staphylococcus aureus* ATCC 6538 and *Salmonella enterica* subsp. *enterica* serovar *typhimurium* ATCC 14028 at a concentration equal or above 2%.

The Bondtite™ 945 tannin extract exhibited a bacteriostatic effect towards *Escherichia coli* ATCC 11229 and *Salmonella enterica* subsp. *enterica* serovar *typhimurium* ATCC 14028 at a concentration between 1 and 2% and towards *Staphylococcus aureus* ATCC 6538 at a concentration of 0.5%.

The Tanac Weibull™ tannin extract exhibited a bacteriostatic effect towards *Escherichia coli* ATCC 11229 at a concentration between 1 and 2%, towards *Salmonella enterica* subsp. *enterica* serovar *typhimurium* ATCC 14028 at a concentration between of about 1% and towards *Staphylococcus aureus* ATCC 6538 at a concentration between 0.5 and 1%.

Determination of Antibacterial Efficiency on Wood Samples

General Methods

The method was based on the determination of the antibacterial efficiency on each of the following wood samples:

Sample A—Treatment with 14.5% Tanac Weibull™ AQ solution in water, and paraffin (ref. number 81696)

Sample B—Treatment with 14.5% Tanac Weibull™ AQ in water (ref. number 81697)

Sample E—No treatment (ref. number 80701)

25% solutions were prepared by diluting 0.1 kg of Tanac Weibull™ in 0.3 kg of water. It was found that a precipitate formed, thus indicating that the point of saturation was reached. It was then determined that the saturation point was around 14.5% of Tanac Weibull™ in water.

Cubic pieces of Maplewood of about 3 mm of thickness with a surface of about 1 $cm^2$ were provided. For Sample A, the pieces were heated on a heating plate at 230° C. for about 45 seconds, and dipped into the tannin solution for about 25 seconds, again heated on the heating plate for about 45 seconds and dipped in paraffin at 65° C. for about 25 seconds. For Sample B, the pieces were heated on a heating plate for about 45 seconds, and dipped into the tannin solution for about 25 seconds. The impregnation rate was calculated to be around 645 $g/m^2$ (60 $g/pi^2$).

The growth inhibition for *Escherichia coli* ATCC 11229 and *Staphylococcus aureus* ATCC 6538 was first determined. A culture of each microorganism was spread at the surface of *Tryptic Soy agar* (TSA) nutrient gel. Treated wood was cut into cubic pieces of about 3 mm of thickness with a surface of about 1 $cm^2$, as prepared above. Each piece was deposited on the nutrient gel, treated face down, contacting the gel, and using two pieces for each microorganism. The petri dishes containing the nutrient gel were closed and incubated for 24 h at 36° C. Sterile filters moistened with demineralized water and with a mercury chloride 0.018 mol/L solution were used and tested as negative and positive controls, respectively. After the incubation period, the growth inhibition zone was measured, and the incubation pursued for three (3) additional days to evaluate the growth under the wooden cubes after the prolonged incubation.

The bactericidal efficiency towards *Escherichia coli* ATCC 11229 and *Staphylococcus aureus* ATCC 6538 was first determined by depositing 100 μL of a normalized suspension of each microorganism on wooden cubic portions having a surface of 1 $cm^2$. Bacteria were counted after a contact time of 1, 2, 4 and 24 h by extracting each sample in a sterile solution of 0.1% peptone and 0.1% polysorbate 80 and diluting to obtain a solution countable by incorporation into nutrient gel of the diluted aliquots incubated for 24 h at 36° C.

The bactericidal efficiency was calculated in function of the initial concentration of each microorganism in the suspension.

Example 4—Growth Inhibition and Bactericidal Efficiency on Wooden Samples

Figure 3:
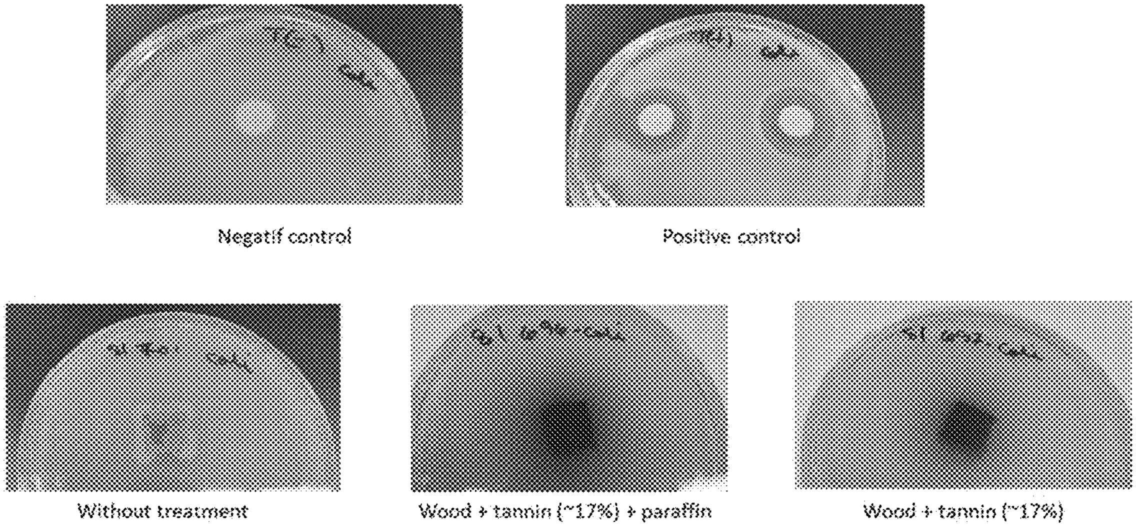
FIG. 3 shows growth inhibition of *E. coli* on test culture for different concentrations of the composition according to exemplary embodiments of the present application.
Figure 4:
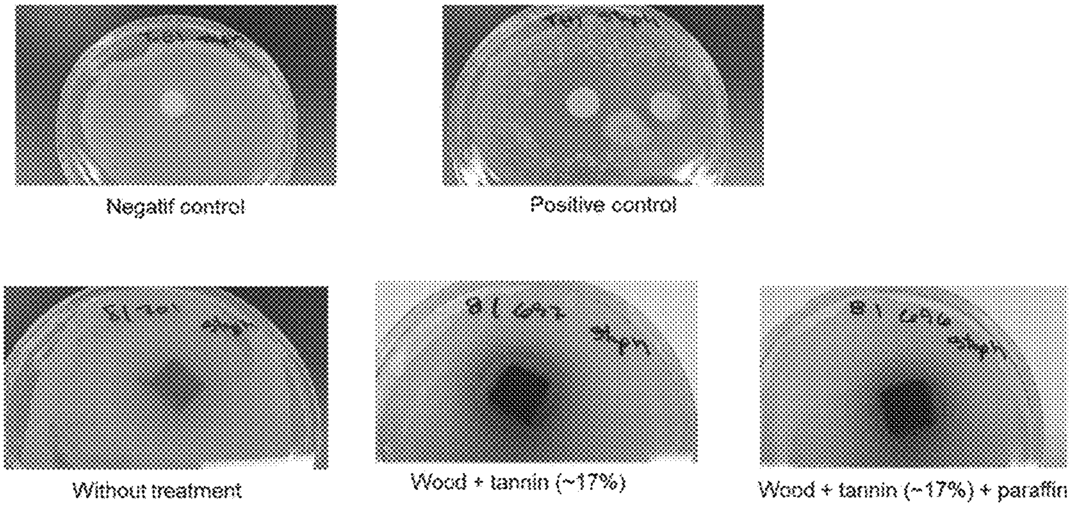
FIG. 4 shows growth inhibition of *S. aureus* on test culture for different concentrations of the composition according to exemplary embodiments of the present application.

Results for the growth inhibition are presented in Table 4, and the nutrient gel assay are shown in FIG. 3 for *E. coli* and FIG. 4 for *S. aureus*.

TABLE 4

Growth inhibition towards *E. coli* and *S. aureus*.

| Ref. No | IDENTIFICATION | Diameter of the inhibition zone (mm) *Escherichia coli* ATCC 12329 | *Staphylococcus aureus* ATCC 6538 |
|---|---|---|---|
| S.A. | Negative control | 0 | 0 |
| S.A. | Positive control | 22 to 23 mm | 32 mm |

TABLE 4-continued

| Growth inhibition towards *E. coli* and *S. aureus*. | | | |
|---|---|---|---|
| | | Diameter of the inhibition zone (mm) | |
| Ref. No | IDENTIFICATION | *Escherichia coli* ATCC 12329 | *Staphylococcus aureus* ATCC 6538 |
| 81696 | Sample A (With treatment) | $0^{(1)}$ | 12 to 16 mm |
| 81697 | Sample B (With treatment) | $0^{(1)}$ | 18 to 19 mm |
| 80701 | Sample E (Without treatment) | $0^{(2)}$ | $0^{(2)}$ |

S.A.: not applicable
(1)No growth under cube
(2)Growth under the cubes

Results for the bactericidal efficiency are presented in Table 5 for *E. coli* and Table 6 for *S. aureus*.

TABLE 5

| Bactericidal efficiency towards *E. coli* | | | | | |
|---|---|---|---|---|---|
| | | Contact time | Counting (CFU* by area) | | |
| Ref. No | IDENTIFICATION | (hours) | Trial 1 | Trial 2 | Average |
| s.a. | In suspension | 0 | $3.8 \times 10^7$ | $3.1 \times 10^7$ | $3.45 \times 10^7$ |
| 816696 | Sample A | 1 | $2.08 \times 10^7$ | $2.24 \times 10^7$ | $2.16 \times 10^7$ |
| | (With treatment) | 2 | $6.8 \times 10^4$ | $4.1 \times 10^4$ | $5.45 \times 10^4$ |
| | | 4 | $3.0 \times 10^4$ | $2.2 \times 10^4$ | $2.6 \times 10^4$ |
| | | 24 | $1.6 \times 10^4$ | $2.8 \times 10^4$ | $2.2 \times 10^4$ |
| 816697 | Sample B | 1 | $1.4 \times 10^6$ | $1.4 \times 10^6$ | $1.4 \times 10^6$ |
| | (With treatment) | 2 | $9.0 \times 10^5$ | $9.0 \times 10^5$ | $9.0 \times 10^5$ |
| | | 4 | $1.01 \times 10^5$ | $1.14 \times 10^5$ | $1.08 \times 10^5$ |
| | | 24 | $4.9 \times 10^4$ | $4.5 \times 10^4$ | $4.7 \times 10^4$ |
| 80701 | Sample E | 1 | $2.84 \times 10^5$ | $3.04 \times 10^5$ | $2.94 \times 10^5$ |
| | (Without | 2 | $8.2 \times 10^4$ | $8.6 \times 10^4$ | $8.4 \times 10^4$ |
| | treatment) | 3 | $6.4 \times 10^4$ | $7.2 \times 10^4$ | $6.8 \times 10^4$ |
| | | 4 | $1.2 \times 10^4$ | $1.6 \times 10^4$ | $1.4 \times 10^4$ |

CFU: Colony forming unit

TABLE 6

| Bactericidal efficiency towards *S. aureus* | | | | | |
|---|---|---|---|---|---|
| | | Contact time | Counting (CFU* by area) | | |
| Ref. No | IDENTIFICATION | (hours) | Trial 1 | Trial 2 | Average |
| s.a. | In suspension | 0 | $1.1 \times 10^7$ | $1.52 \times 10^7$ | $1.31 \times 10^7$ |
| 816696 | Sample A | 1 | $3.4 \times 10^6$ | $4.0 \times 10^6$ | $3.7 \times 10^6$ |
| | (With treatment) | 2 | $2.2 \times 10^3$ | $1.5 \times 10^3$ | $1.85 \times 10^3$ |
| | | 4 | $8.0 \times 10^3$ | $1.4 \times 10^4$ | $1.1 \times 10^4$ |
| | | 24 | $4.1 \times 10^4$ | $4.7 \times 10^4$ | $4.4 \times 10^4$ |
| 816697 | Sample B | 1 | $9.2 \times 10^4$ | $9.2 \times 10^4$ | $9.2 \times 10^4$ |
| | (With treatment) | 2 | $1.16 \times 10^5$ | $1.1 \times 10^5$ | $1.13 \times 10^5$ |
| | | 4 | $2.6 \times 10^4$ | $2.6 \times 10^4$ | $2.6 \times 10^4$ |
| | | 24 | $6.4 \times 10^2$ | $5.2 \times 10^2$ | $5.8 \times 10^2$ |
| 80701 | Sample E | 1 | $2.0 \times 10^6$ | $8.0 \times 10^5$ | $1.4 \times 10^5$ |
| | (Without | 2 | $1.0 \times 10^6$ | $4.0 \times 10^5$ | $7.0 \times 10^5$ |
| | treatment) | 3 | $4.0 \times 10^5$ | $4.0 \times 10^5$ | $4.0 \times 10^5$ |
| | | 4 | $1.22 \times 10^5$ | $1.38 \times 10^5$ | $1.3 \times 10^5$ |

CFU: Colony forming unit

The gross reduction of bacterial populations for each sample was calculated in function of the initial concentration in the suspension, as well as the net reduction over the sample with no treatment, for each of the contact time as reported in Table 7.

TABLE 7

Reduction of bacterial populations

| No IQ-CRIQ | IDENTIFICATION | Contact time (hours) | *Escherichia coli* Raw reduction (%) | *Escherichia coli* Net reduction (%) | *Staphylococcus aureus* Raw reduction (%) | *Staphylococcus aureus* Net reduction (%) |
|---|---|---|---|---|---|---|
| 80701 | Without treatment | 1 | 99.15 | — | 89.31 | — |
| | | 2 | 99.76 | — | 94.66 | — |
| | | 4 | 99.80 | — | 96.95 | — |
| | | 24 | 99.96 | — | 99.01 | — |
| 81696 | A | 1 | 37.39 | 0.00 | 71.76 | 0.00 |
| | Wood + tannin | 2 | 99.84 | 0.09 | 99.99 | 5.33 |
| | (~17%) + paraffin | 4 | 99.92 | 0.12 | 99.92 | 2.97 |
| | (81696) | 24 | 99.94 | 0.00 | 99.96 | 0.66 |
| 81697 | B | 1 | 95.94 | 0.00 | 99.30 | 9.98 |
| | Wood + tannin | 2 | 97.39 | 0.00 | 99.14 | 4.48 |
| | (~17%) (81697) | 4 | 99.69 | 0.00 | 99.80 | 2.85 |
| | | 24 | 99.86 | 0.00 | 100 | 0.99 |

Figure 5:
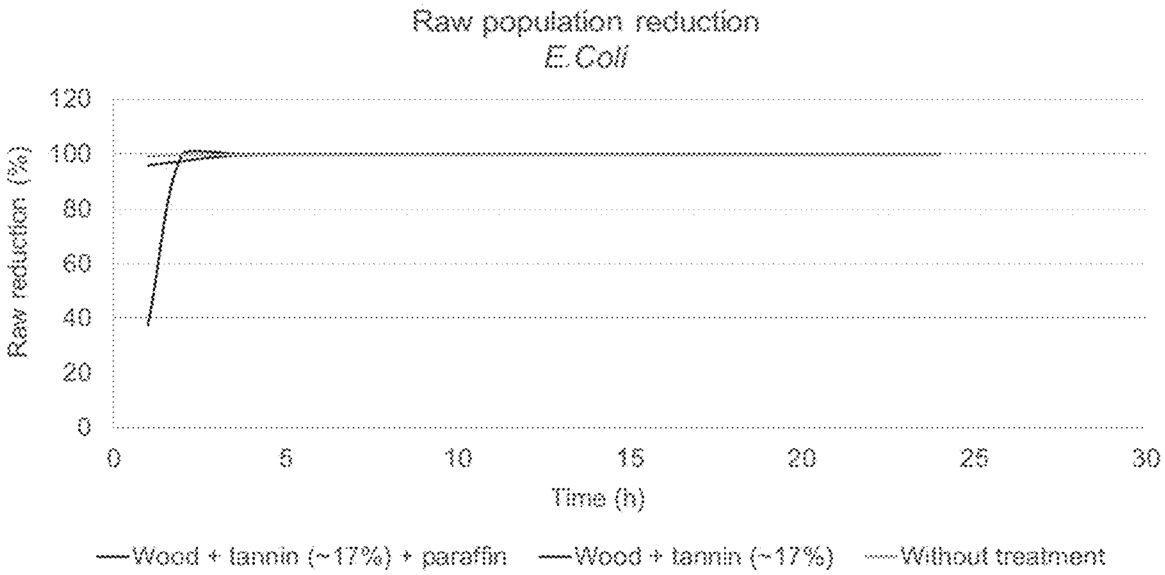
FIG. 5 shows a graph of growth reduction of *E. coli* in function of time for different compositions according to exemplary embodiments of the present application.
Figure 6:
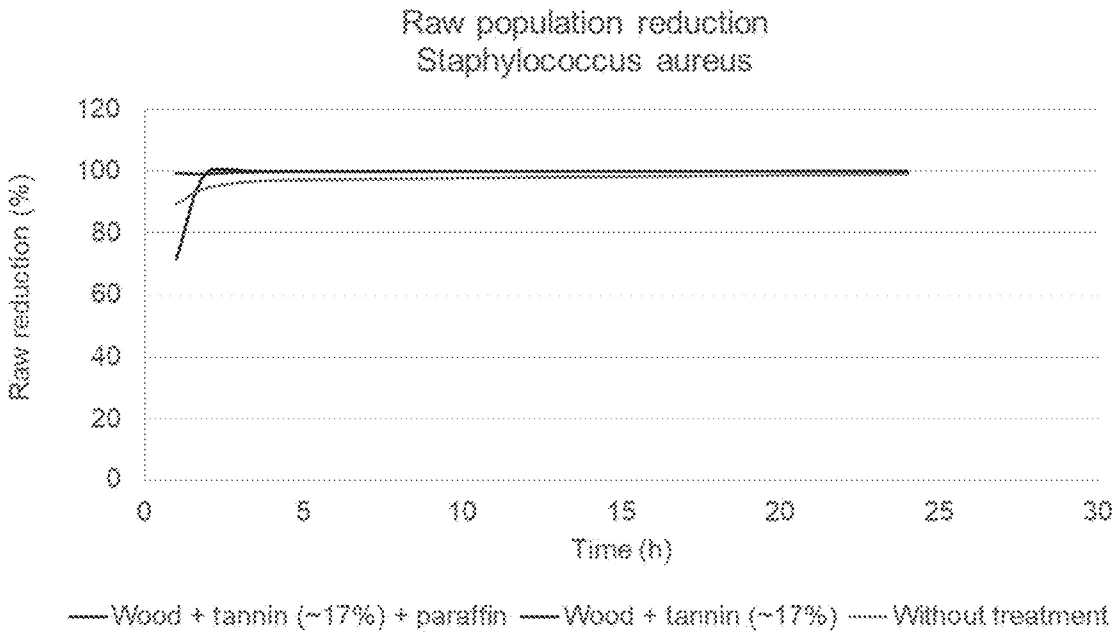
FIG. 6 shows a graph of growth reduction of *S. aureus* in function of time for different concentrations of the composition according to exemplary embodiments of the present application.

These results were reported as graphs in FIG. 5 for *E. coli* and FIG. 6 for *S. aureus.*

Results

Samples A and B contributed to significantly reduce the populations of *S. aureus*. In addition, it was demonstrated that *S. aureus* does not survive well on these samples compared to sample E without treatment.

Example 5—Growth Inhibition on Wooden Samples

Further tests for determining growth inhibition towards *E. coli* and *S. aureus* were conducted as described in the general methods above, but using the following samples:

Sample 1—Treatment with impregnation of Tanac Weibull™ and paraffin, and spraying once (ref.:82188)

Sample 2—Treatment with impregnation of Tanac Weibull™ and paraffin, and spraying five times (ref.: 82189)

Sample 4—Treatment with impregnation of Tanac Weibull™, and spraying once (ref.:82190)

Sample 5—Treatment with impregnation of Tanac Weibull™ and paraffin, and spraying five times (ref.: 82191)

Sample E—no treatment (ref.:81701)

A 13% solution was prepared by diluting 104 g of Tanac Weibull™ in 696 g of water. It was found that a precipitate formed, thus indicating that the point of saturation was reached. It was then determined that the saturation point was around 14.5% of Tanac Weibull™ in water.

Cubic pieces of Maplewood of about 1 cm of thickness with a surface of about 220 $cm^2$ were provided. For Samples 1 and 2, the pieces were heated on a heating plate at 230° C. for about 45 seconds, and dipped into the tannin solution for about 25 seconds, again heated on the heating plate for about 45 seconds and dipped in paraffin at 65° C. for about 25 seconds. For Samples 4 and 5, the pieces were heated on a heating plate for about 45 seconds, and dipped into the tannin solution for about 25 seconds. The impregnation rate was calculated to be around 301 $g/m^2$ (28 $g/pi^2$).

After the above impregnation, manual vaporization of the Tanac Weibull™ solution was also conducted. Samples 1 and 4 were sprayed once and Samples 2 and 5 were sprayed five times each, with 24 h between each spray.

Figure 7:
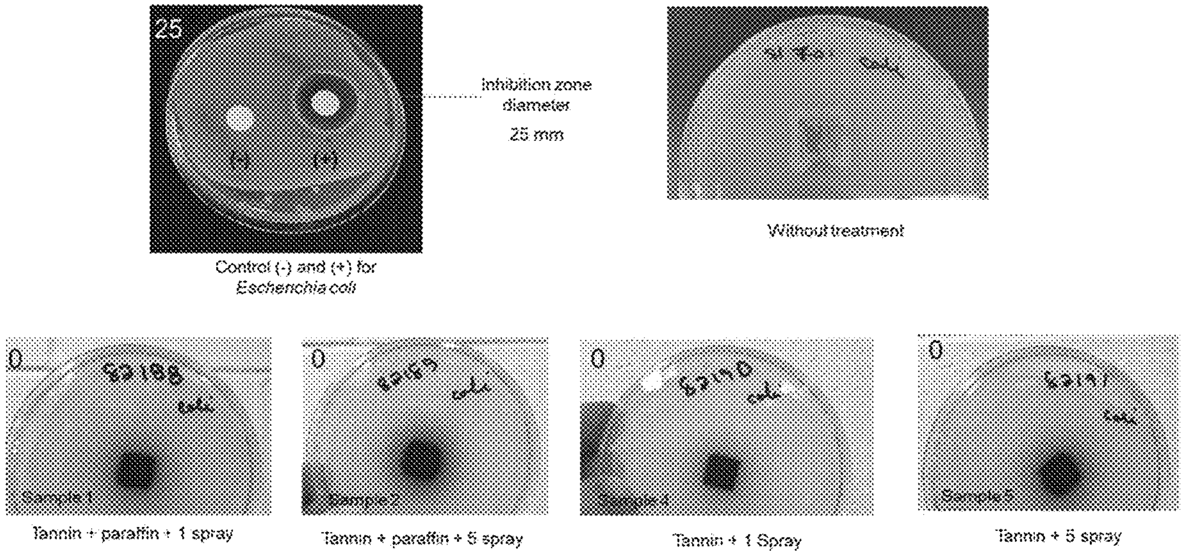
FIG. 7 shows growth inhibition of *E. coli* on test culture for different concentrations of the composition according to exemplary embodiments of the present application.
Figure 8:
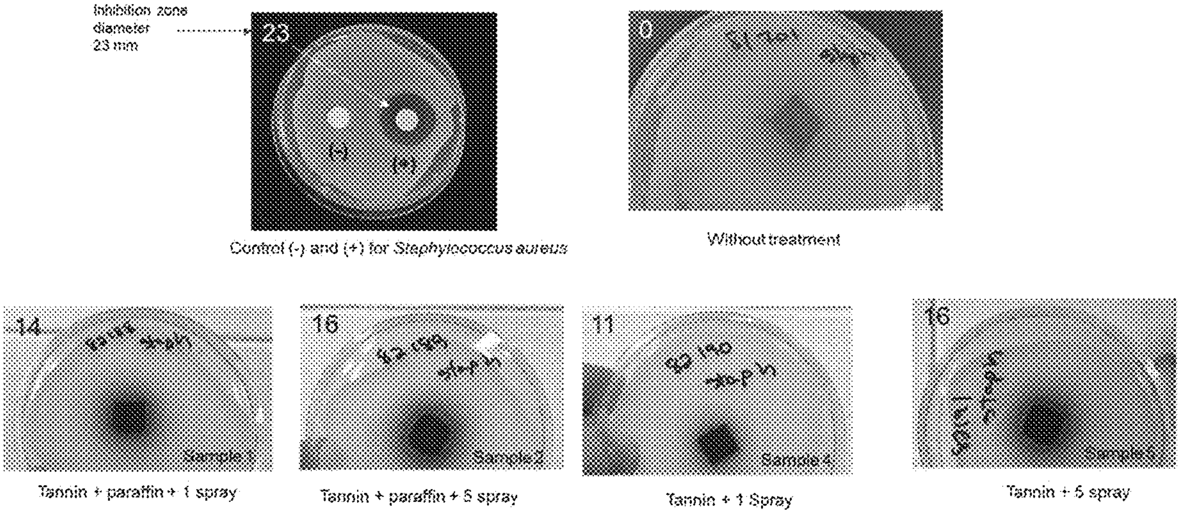
FIG. 8 shows growth inhibition of *S. aureus* on test culture for different concentrations of the composition according to exemplary embodiments of the present application.

The results for the growth inhibition are presented in Table 8, and the nutrient gel assay are shown in FIG. 7 for *E. coli* and FIG. 8 for *S. aureus*.

TABLE 8

Growth inhibition towards *E. coli* and *S. aureus*.

| Ref. No | IDENTIFICATION | Diameter of the inhibition zone (mm) *Escherichia coli* ATCC 11229 | *Staphylococcus aureus* ATCC 6538 |
|---|---|---|---|
| n.a. | Negative control | 0 | 0 |
| n.a. | Negative control | 23 mm | 25 mm |
| 81188 | Sample 1 | 0(1) | 14 mm |
| 82189 | Sample 2 | 0(1) | 16 mm |
| 82190 | Sample 4 | 0(1) | 11 mm |
| 82191 | Sample 5 | 0(1) | 16 mm |
| 81701 | Sample E (Without treatment) | 0(2) | 0(2) |

n.a.: not applicable
(1)No growth under cube
(2)Growth under the cubes

Samples 1, 2 and 5 efficiently inhibited the growth of *S. aureus*. Although the growth of *E. coli* was not visibly inhibited, there was no *E. coli* growth between the nutrient gel and those samples, which was present in Sample E without treatment.

Qualitative Determination of Antibacterial Effect on *E. coli* on Wood Samples

General Methods

The method was based on the determination of the antibacterial effect on *E. coli* for each of the following wood samples:

Sample X—Treatment by impregnation of a 13% Tanac Weibull™ AQ solution in water, and spraying five times (ref. number 82691)

Sample Y—Treatment by impregnation in a 13% Tanac Weibull™ AQ and paraffin, and spraying five times (ref.:82191)

Sample Z—No treatment (ref. number 82696)

as well as a saturated solution (about 14.5%) of Tanac Weibull™ AQ in water.

Example 6—Antibacterial Effect on *E. coli*

Cubic pieces of Maplewood of about 1 cm of thickness with a surface of about 220 $cm^2$ were provided. For Sample Y, the pieces were heated on a heating plate at 230° C. for about 45 seconds, and dipped into the tannin solution for about 25 seconds, again heated on the heating plate for about 45 seconds and dipped in paraffin at 65° C. for about 25 seconds. For Sample X, the pieces were heated on a heating plate for about 45 seconds, and dipped into the tannin solution for about 25 seconds.

After the above impregnation, manual vaporization of the Tanac Weibull™ solution was also conducted. Samples X and Y were sprayed five times each, with 24 h between each spray.

The growth inhibition for *Escherichia coli* ATCC 11229 was determined. A culture of the microorganism was spread at the surface of *Tryptic Soy agar* (TSA) nutrient gel. Treated wood cubic pieces of about 3 mm of thickness with a surface of about 1 $cm^2$, as prepared above. The wooden pieces of Sample X (duplicated) were then rehumidified with water, Sample Y was not rehumidified and two Samples Z (no treated) were used: as is and rehumidified. Each piece was deposited on the nutrient gel, treated face down, contacting the gel. In parallel, a filter was impregnated with the saturated solution (about 16.5%) and deposited on the nutrient gel. The petri dishes containing the nutrient gel were closed and incubated for 24 h and 48 h at 36° C. Sterile filters moistened with demineralized water and with a mercury chloride 0.018 mol/L solution were used and tested as negative and positive controls, respectively. After the incubation period, the growth inhibition zone was measured and the incubation pursued at 48 h to evaluate the growth under the wooden cubes after the prolonged incubation.

Figure 9:
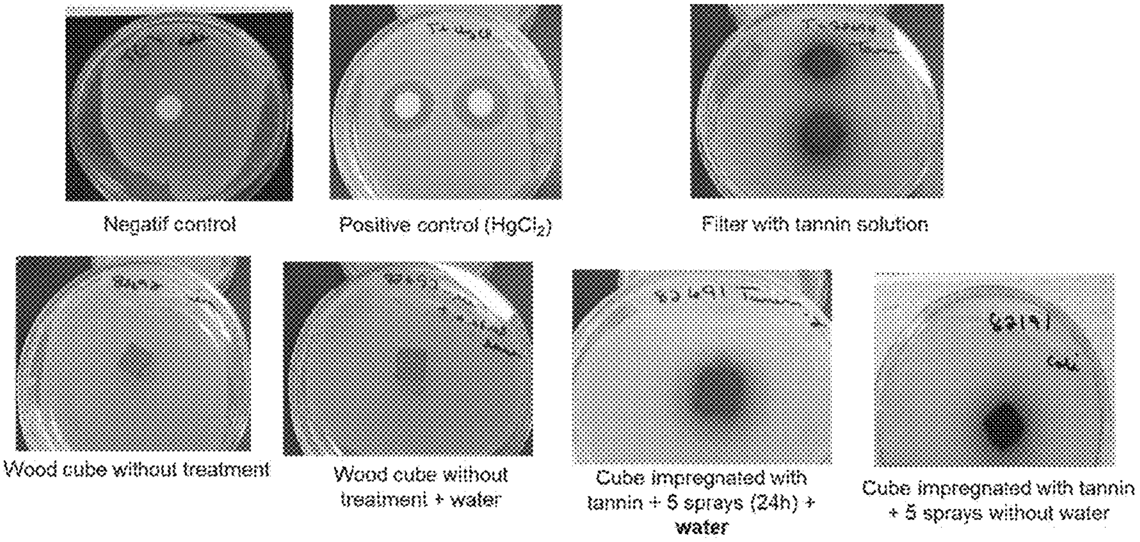
FIG. 9 shows growth inhibition of *E. coli* on test culture for different concentrations of the composition according to exemplary embodiments of the present application.

The results for the growth inhibition are presented in Table 9, and the nutrient gel assay are shown in FIG. 9.

TABLE 9

| Ref. No | Samples | Conditions | Diameter of the inhibition zone (mm) after 48 h *Escherichia coli* ATCC 112290 |
|---|---|---|---|
| n.a. | Filter | Demineralised water | 0 |
| n.a. | Filter (2) | With $HgCl_2$ | 22 |
| 82691 | Cube impregnated with tannin + 5 spraying (24 h) | with 60 µL sterile water | ±11 (3) |
| 82691 (duplicate) | Cube impregnated with tannin + 5 spraying (24 h) | with 60 µL sterile water | ±11 (3) |
| 82692 | Cube without treatment | with 60 µL sterile water | 10(4) |
| 82692 | Cube without treatment | Without adding water | 10(4) |
| 82694 | Tannin solution around 17% | Filter with 100 µL of tannin solution | 11(4) |
| 82191 | Cube impregnated with tannin + 5 spraying. | No Water added | 10(4) |

n.a.: not applicable
(2) Filter Diameter = 10 mm
(3) Difficult to identify if there is growth below the squares with tannins because of the too dark color.
(4) No growth below the surface of the sample (Cube width = 10 mm)

Figure 10A:
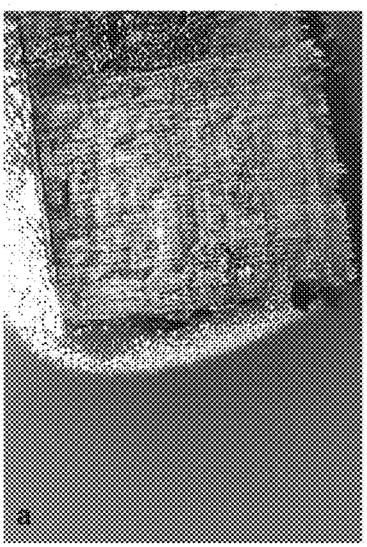
FIGS. 10A-10C show growth inhibition of *E. coli* on test culture according to exemplary embodiments of the present application.
Figure 10B:
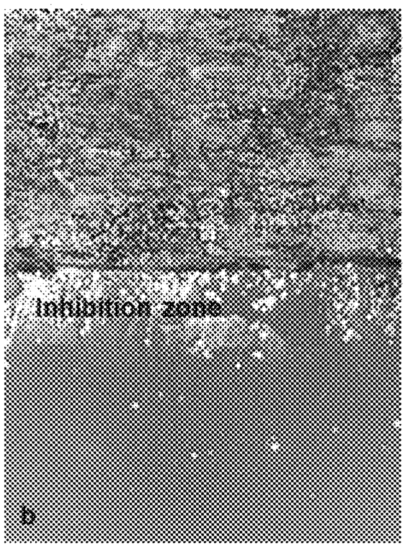

The cubes without treatment, either humidified or not, did not shown any inhibition zone after 48 h incubation. At the contrary, an inhibition zone was detected (at 4-10× magnification) around humidified Sample X (see FIG. 10A, FIG. 10B). This is more apparent when no water is added, as for Sample Y.

Figure 10C:
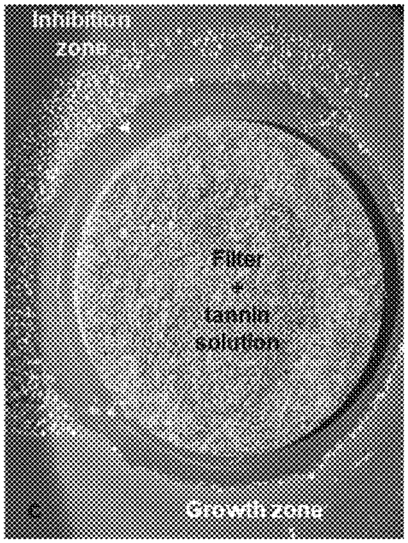

To directly assess the inhibition effect of the tannin in these conditions, a filter impregnated with 100 µL of solution, as mentioned above was used. For these assays, an inhibition zone similar to that of Sample X was observed (see FIG. 10C).

Conclusions

Without being bound to theory, the tannin impregnated on wood appears to have an inhibition effect on *E. coli*, although not as important as that against *S. aureus*. The humidification of the treated surface does not have a significant effect on the inhibition effect in these conditions, while still showing inhibition. Finally, the inhibition effect on *E. coli* appears to be independent on the matrix, i.e. wood or filter. The inhibition effect appears directly linked to the intrinsic property of the tannin.

Example 7—Growth Inhibition on Wooden Boards

General Methods

The method was based on the determination of the antibacterial effect on *E. coli* for each of the following wood boards:

- Sample A—30 cm board, treatment by impregnations of a 13% Tanac Weibull™ AQ solution in water, and spraying five times (ref. number 82685)
- Sample B—30 cm board, treatment by impregnations of paraffin (ref.:82686)
- Sample C—100 cm board, no treatment (ref. number 82687)
- Sample D—100 cm board, treatment by impregnations of paraffin (ref.:82688)
- Sample E—100 cm board, treatment by impregnations of a 13% Tanac Weibull™ AQ solution in water, and spraying five times (ref. number 82689)
- Sample F—10 cm board, treatment by impregnations of a 13% Tanac Weibull™ AQ solution in water, treatment by impregnations of paraffin, and spraying five times (ref.:82690)

Antibacterial Effect on *E. coli*

In order to quantitatively determine the antibacterial effect of the wood treatment of the present application towards *E. coli*, the present tests were conducted in two stages:

- verification of residual bacteriostatic agents on growth media MacConkey, MCT Agar and DE Neutralizing;
- evaluation of the antibacterial effect on treated wood boards.

At the second stage, the quantification of the bacteria present on the wooden boards must be done using growth media. When the growth media comes into contact with the wooden surface (treated or non-treated), bacteria are transferred to the growth media. This media must allow growth and quantification of the transferred bacteria. As such, verification of residual bacteriostatic agents must be made on the above-mentioned growth media. This verification allows to select a suitable growth media, able to cancel the residual inhibitory effect of the substance from the contact with the treated wood surface.

Verification of Residual Bacteriostatic Agents on Growth Media MacConkey, MCT Agar and DE Neutralizing For proper selection of the growth media, it must be considered that tannins are polyphenols, which have antibacterial effect on inhibiting bacteria growth when transferred to the growth media. Verification was thus conducted to identify the most suitable growth media for optimal growth and quantification of *E. coli* in the presence of tannins.

Growth media MacConkey, MCT Agar and DE Neutralizing prepared in Petri dishes (RODAC) were used:

MacConkey: selective and differential media allowing for isolation of *E. coli* bacteria;

MCT Agar: recommended media for microorganisms' detection on surfaces sanitized with quaternary ammonium compounds, phenolic compounds or formol; and DE Neutralizing: media which neutralizes a large spectrum of antiseptics and sanitizing chemical compounds, including phenols.

Each media was contacted for 10 seconds with Sample A or B (30 cm board treated with tannins—82685—and 30 cm board treated with paraffin—82686). Then, a droplet of *E. coli* (±50 μL at about $10^3$ UFC/mL) was added and spread at the surface of each Petri dish, which were closed and incubated for 24 h at 36° C. The DE Neutralizing media was selected—as seen in the Results section.

Evaluation of the Antibacterial Effect on Treated Wood Boards

Figure 11:
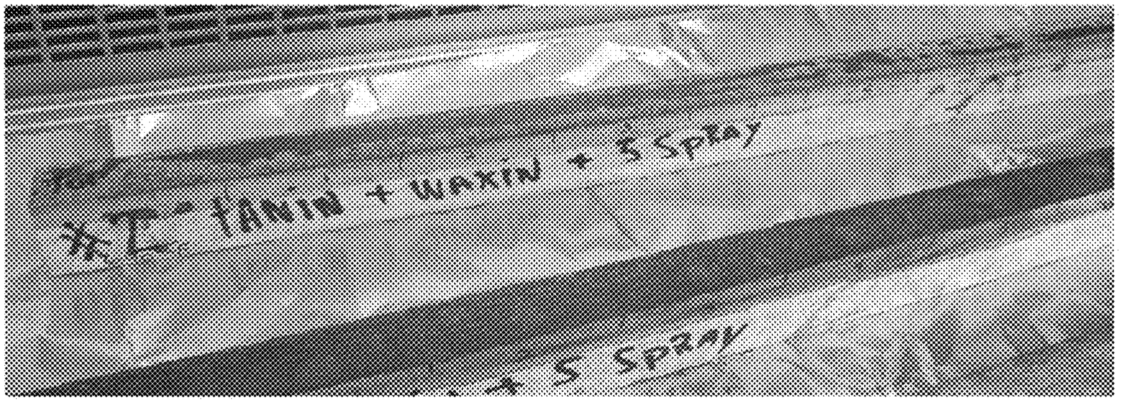
FIG. 11 shows wooden treated boards according to exemplary embodiments of the present application.
Figure 12A:
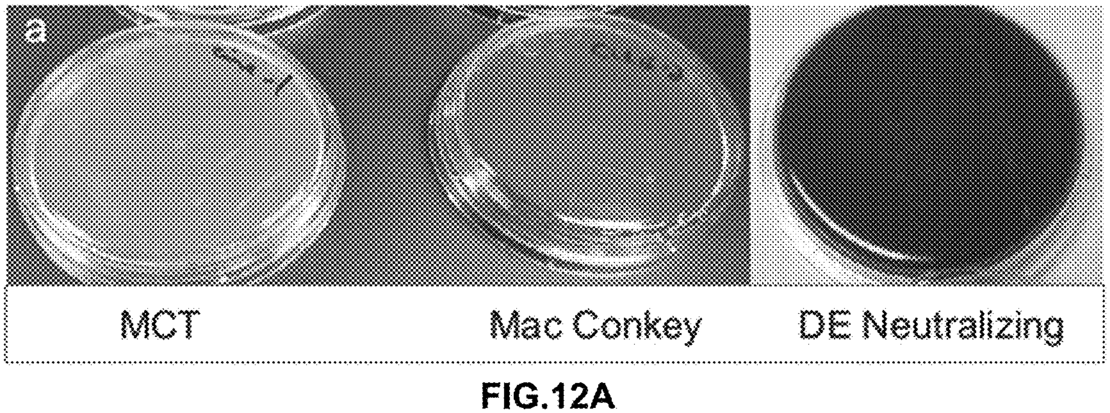
FIGS. 12A-12B show different growth media before incubation according to exemplary embodiments of the present application.
Figure 12B:
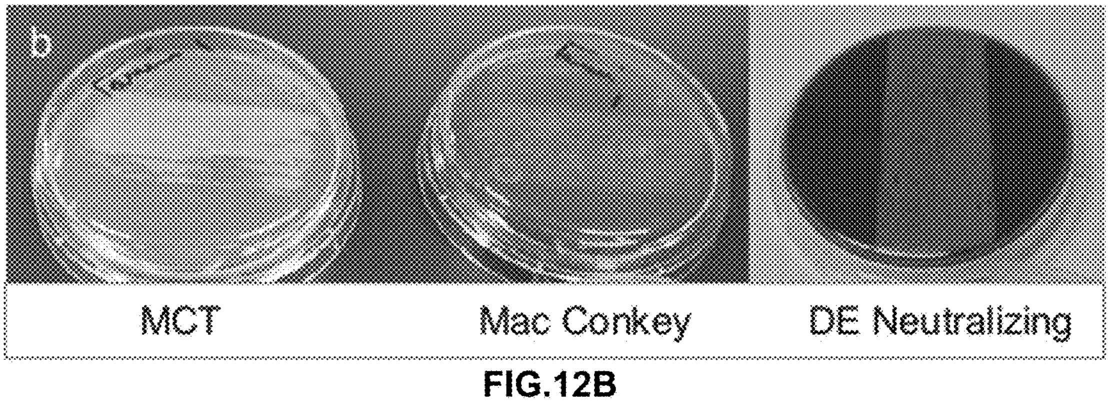

Each 100 cm wooden board, treated or non-treated, was divided into twelve (12) zones, as shown in FIG. 11. Then, a 50 μL solution of nutritive broth containing about $10^3$ UFC/mL was spread in the center of each zone. Each board was exposed to ambient temperature. The selected DE Neutralizing media was contacted for 10 seconds with each of the inoculated wooden surface at time 0, 1 h, 4 h and 24 h to measure the growth of *E. coli* in function of time. Triplicates were also generated for each time. Each petri dishes were closed and incubated for 24 h at 36° C.

Results

Results for verification of residual bacteriostatic agents on each of the three (3) growth media are represented in FIG. 12A, FIG. 12B, FIG. 13A, FIG. 13B, FIG. 13C, and FIG. 14A, FIG. 14B, and FIG. 14C. The residue left from contact with the wooden board treated with tannin is clearly visible on FIG. 12B.

Figures 13A, 13B, 13C:
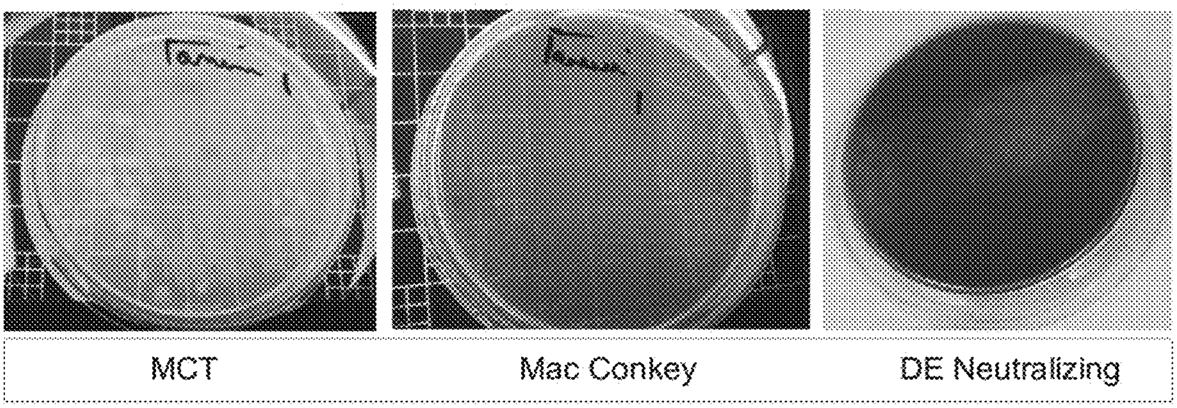
FIGS. 13A-13C show growth inhibition of *E. coli* following contact with wooden board treated with tannin and incubation (24 h, 36° C.) on different growth media according to exemplary embodiments of the present application.
Figure 14A:
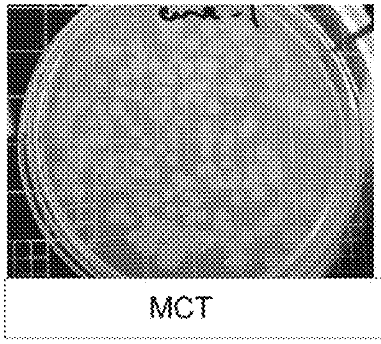
FIGS. 14A-14C shows growth inhibition of *E. coli* following contact with wooden board treated with paraffin and incubation (24 h, 36° C.) on different growth media according to exemplary embodiments of the present application.
Figure 14B:
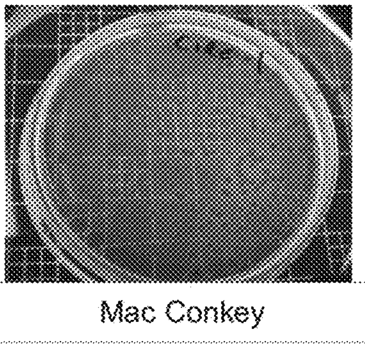
Figure 14C:
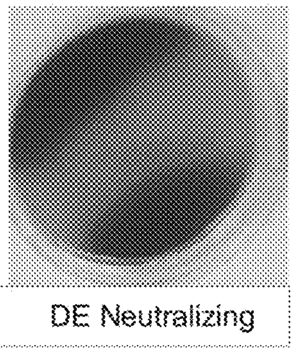

It was observed that, following incubation, the central zone of the MCT and MacConkey media that was contacted with the treated board (Sample A) did not show significant growth of the bacteria (FIG. 13A and FIG. 13B). However, when these media were contacted with Sample B (treated with paraffin), bacteria were growing (FIG. 14 A and FIG. 14B). This indicates that the MCT and MacConkey media are not suitable to quantify the *E. coli* bacteria in the presence of tannins. Simple contact between the growth media and the boards treated with tannins appear to leave a residue inhibiting bacterial growth. Indirectly, this allowed to qualitatively confirm the inhibiting effect of tannins.

To avoid this inhibitory effect, DE Neutralizing media was selected for quantification of *E. coli* growth on treated and untreated wooden boards. As previously indicated, the goal was to select a suitable growth media allowing growth of *E. coli* that survived on the surface of treated wood and able to cancel the residual inhibitory effect of the substance that are transferred to the surface of the media upon contact. A drawback of this media is the fact that it is not selective, thus allowing growth of other microorganisms present at the surface of the wood.

Figure 15:
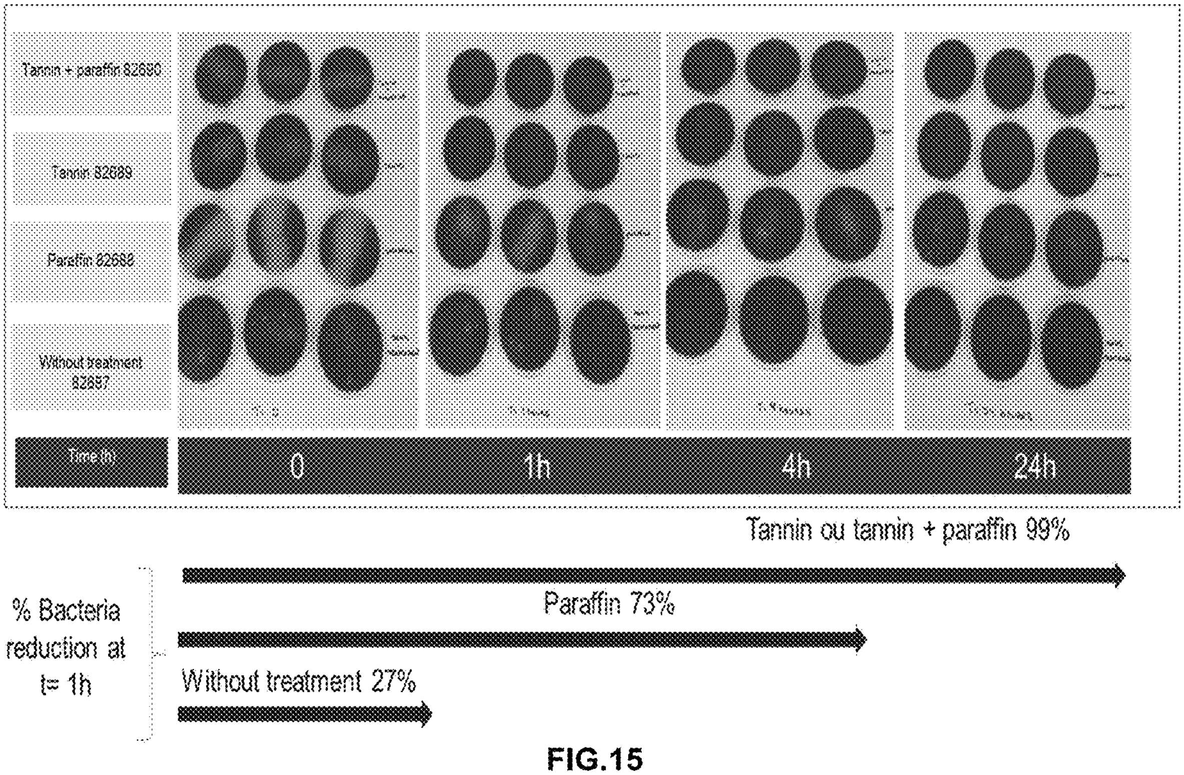
FIG. 15 shows the evolution of the number of *E. coli* bacteria from different sample wooden boards according to exemplary embodiments of the present application, in function of time at: t=0; t=1 h, t=4 h; and t=24 h.
Figure 16:
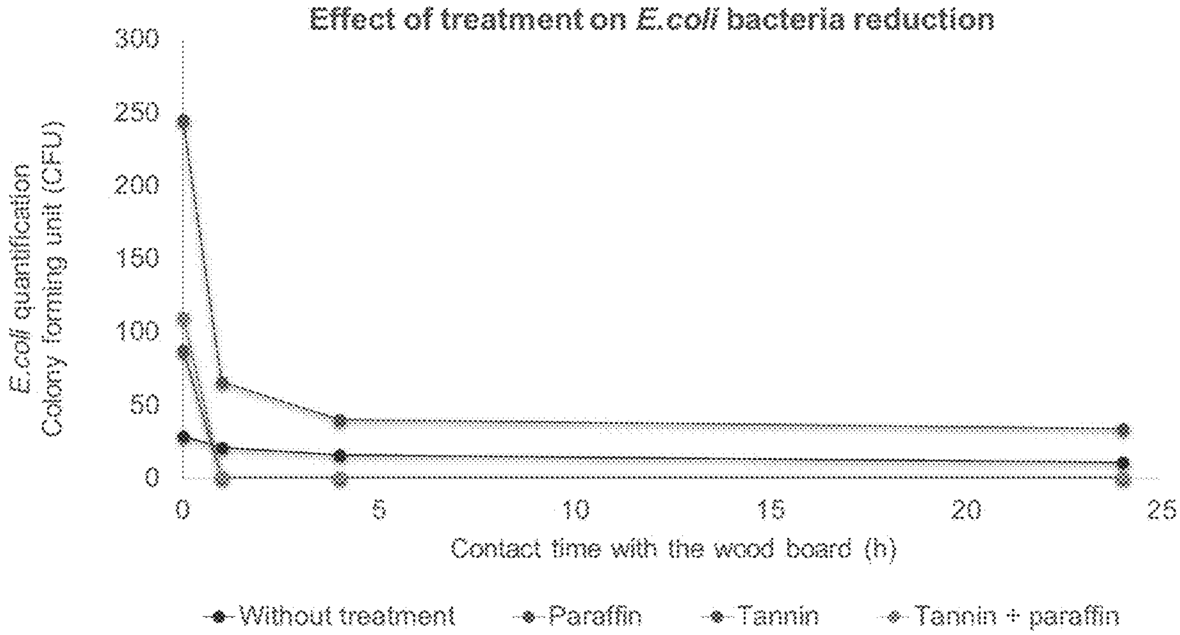
FIG. 16 shows graphs of gross reduction of *E. coli* in function of time for different sample wooden boards according to exemplary embodiments of the present application.
Figure 17:
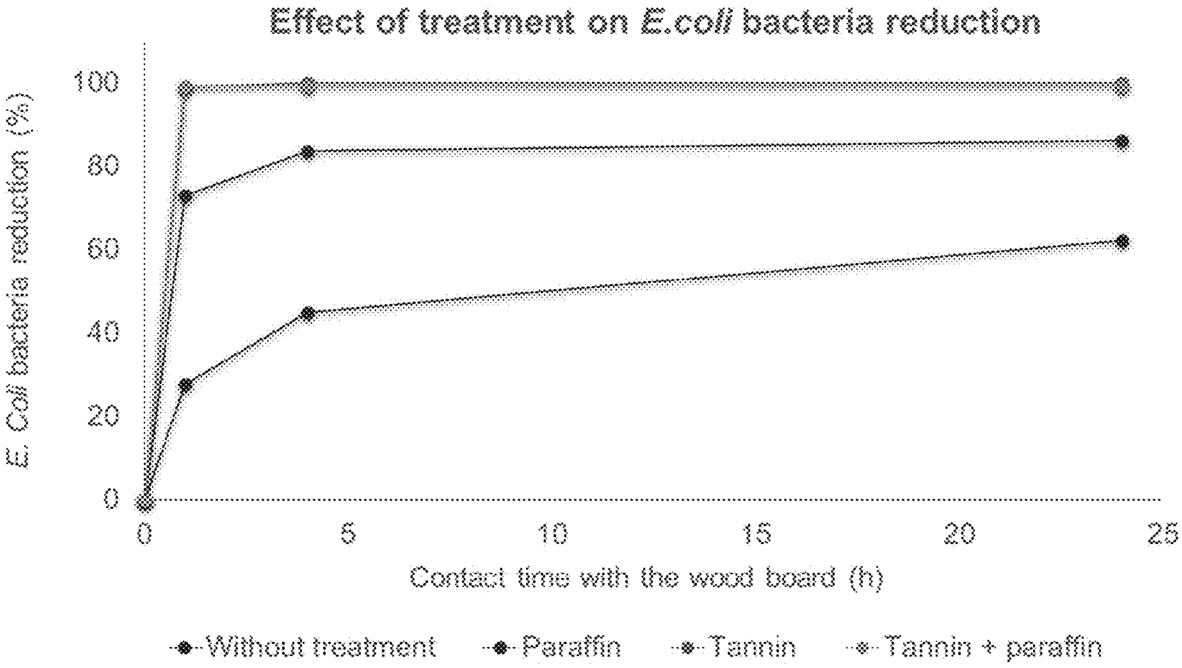
FIG. 17 shows graphs of reduction percentage of *E. coli* in function of time for different sample wooden boards according to exemplary embodiments of the present application.

Results from the evaluation of the antibacterial effect on treated wood boards towards *E. coli* are presented in FIG. 15, FIG. 16 and FIG. 17.

On FIG. 15, bacterial samples taken from each wooden samples at different time can be seen (o, 1 h, 4 h and 24 h). The yellow zone on the media (DE Neutralizing) indicate the presence of *E. coli*. A decrease of bacterial concentration correlates by a less intense coloration. In case of the non-treated sample (Sample C), diffusion of the bacterial solution inside the wooden board was observed, which is thought to be caused by the high permeability of the untreated wood. This may explain the low bacterial concentration transferred at t=0. Generally, it can be observed that the boards with and without treatment show reduction of bacteria over time, but this decrease is accentuated for the boards treated with tannins.

FIG. 16 shows the gross diminution of the number of *E. coli* in function of time. After a contact time of one (1) hour between the bacteria and the wood surface, a drastic diminution of *E. coli* was observed. The decrease rate then diminished between 1 h and 24 h. For the untreated sample, the decrease rate was much lower compared to the treated samples. As previously indicated, due to infiltration of the bacterial solution into the untreated wood, the initial number of bacteria on the surface (29 CFU—Colony Forming Unit) was lower than those of the samples treated with paraffin (250 CFU) and tannin (91 CFU).

On FIG. 17, the net effect of tannin on bacterial reduction is observed. It can be seen that the presence of paraffin does not inhibit the bacterial effect of tannin. The reduction percentage of *E. coli* in the presence of tannin or tannin/paraffin was around 99%. The presence of tannin, with or without paraffin, favor the bacterial reduction by 26% compared with paraffin treatment alone and by 72% compared to no treatment.

CONCLUSIONS

Without being bound to theory, and only with reference to products used in the above Example, it can be concluded that:

Due to the phenolic composition of the tannin extract, the only suitable media allowing quantification of the *E. coli* bacteria on wooden boards treated with tannin and without treatment was DE Neutralizing.

The presence of paraffin does not appear to inhibit the antibacterial effect of tannins.

The presence of tannin, with or without paraffin, favors the bacterial reduction by 26% compared with paraffin treatment alone and by 72% compared to no treatment.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A wood treatment composition comprising:

an antimicrobial additive comprising at least one tannin; and a water-based solvent; wherein the antimicrobial additive is present in an amount of from 12% to 15% by weight of the composition.

2. The wood treatment composition of claim 1, wherein the at least one tannin is selected from the group consisting of *Limonium delicatulum* extract, *Pinus radiata* extract, *Acacia mollissima* extract, *Coriaria nepalensis* extract, *Picea abies* extract, *Myrciaria jaboticaba* extract, *Anadenanthera macrocarpa* extract, *Spondias tuberosa* extract, *Mimosa tenuiflora* extract, *Acacia mearnsii* extract, and combinations thereof.

3. The wood treatment composition of claim 1, wherein the at least one tannin is a mimosa tree extract.

4. The wood treatment composition of claim 1, wherein the water-based solvent comprises water, and a water-miscible solvent selected from ethylene glycol, ethanol, methanol, and mixtures thereof.

5. The wood treatment composition of claim 1, wherein the water-based solvent is water.

6. The wood treatment composition of claim 1, wherein the composition is saturated with the antimicrobial additive.

7. The wood treatment composition of claim 1, wherein the composition provides at least about 95% reduction in growth of microbes.

8. The wood treatment composition of claim 7, wherein the microbes are selected from the group consisting of *Escherichia coli, Staphylococcus aureus, Salmonella enterica* subsp. *enterica* serovar *typhimurium, Enterobacter aerogenes, Salmonella enterica, K. pneumoniae, Pseudomonas aeruginosa*, and combinations thereof.

9. The wood treatment composition of claim 1, wherein the composition provides at least about 99% reduction in growth of microbes.

10. The wood treatment composition of claim 1, wherein the at least one tannin is selected from the group consisting of *Limonium delicatulum* extract, *Pinus radiata* extract, *Acacia mollissima* extract, *Coriaria nepalensis* extract, *Picea abies* extract, *Myrciaria jaboticaba* extract, *Anadenanthera macrocarpa* extract, *Spondias tuberosa* extract, *Mimosa tenuiflora* extract, *Acacia mearnsii* extract, and combinations thereof; and wherein the water-based solvent is water.

11. A wood product treated with the composition of claim 1.

12. The wood product of claim 11 having at least one surface treated with the composition.

13. The wood product of claim 11, wherein the wood product is a food-contacting wood surface.

14. The wood product of claim 11, wherein the wood product is a floor, a pallet, a cutting board, a wooden container.

* * * * *